United States Patent
Black et al.

(10) Patent No.: US 7,646,802 B2
(45) Date of Patent: Jan. 12, 2010

(54) COMMUNICATION RECEIVER WITH HYBRID EQUALIZER

(75) Inventors: Peter J. Black, San Diego, CA (US); Michael A. Howard, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 10/629,157

(22) Filed: Jul. 28, 2003

(65) Prior Publication Data

US 2004/0240531 A1  Dec. 2, 2004

Related U.S. Application Data

(60) Provisional application No. 60/475,250, filed on Jun. 2, 2003.

(51) Int. Cl.
*H04B 1/00* (2006.01)
(52) U.S. Cl. .................. 375/147; 375/136; 375/142; 375/150; 375/152; 375/229; 375/316
(58) Field of Classification Search .......... 375/147, 375/229, 331, 231–233, 136, 142, 150, 152, 375/316
See application file for complete search history.

(56) References Cited

U.S. PATENT DOCUMENTS

| 5,375,143 A | * | 12/1994 | Kazecki et al. | ......... 375/233 |
| 5,490,165 A | | 2/1996 | Blakeney, II et al. | |
| 5,550,868 A | * | 8/1996 | Boccuzzi | ......... 375/330 |
| 5,764,687 A | | 6/1998 | Easton | |
| 5,799,005 A | | 8/1998 | Soliman | |
| 5,852,630 A | | 12/1998 | Langberg et al. | |
| 5,903,554 A | | 5/1999 | Saints | |
| 6,026,115 A | * | 2/2000 | Higashi et al. | ......... 375/148 |
| 6,167,081 A | * | 12/2000 | Porter et al. | ......... 375/232 |
| 6,175,588 B1 | * | 1/2001 | Visotsky et al. | ......... 375/148 |
| 7,065,136 B1 | * | 6/2006 | Porter et al. | ......... 375/232 |
| 7,082,174 B1 | | 7/2006 | Smee et al. | |
| 7,397,844 B2 | | 7/2008 | Smee | |
| 2003/0087622 A1 | * | 5/2003 | Jayaraman et al. | ......... 455/307 |
| 2004/0042537 A1 | * | 3/2004 | Frank | ......... 375/152 |

FOREIGN PATENT DOCUMENTS

| EP | 1128569 | | 8/2001 |
| EP | 1233536 | | 8/2002 |
| WO | 02/09305 A2 | | 1/2002 |
| WO | WO-02/09305 | * | 1/2002 |
| WO | 0223742 | | 3/2002 |
| WO | 2004/017655 A1 | | 2/2004 |

OTHER PUBLICATIONS

International Search Report, PCT/US2004/017578 - International Search Authority - European Patent Office, Oct. 19, 2004.
Written Opinion, PCT/US2004/017578 - International Search Authority - European Patent Office, Oct. 18, 2004.

* cited by examiner

*Primary Examiner*—Ted M Wang
(74) *Attorney, Agent, or Firm*—Ken Vu; Stanton Braden

(57) ABSTRACT

Wireless communication receiver with hybrid equalizer and RAKE receiver. The receiver compares performance of the system for RAKE only and RAKE in combination with equalizer estimates. The receiver enables or disables the equalizer accordingly.

25 Claims, 6 Drawing Sheets

COMMUNICATION RECEIVER WITH HYBRID EQUALIZER

CLAIM OF PRIORITY UNDER 35 U.S.C. §119

The present Application for Patent claims priority to Provisional Application No. 60/475,250 entitled "COMMUNICATION RECEIVER WITH HYBRID EQUALIZER" filed Jun. 2, 2003, and assigned to the assignee hereof.

BACKGROUND

1. Field

The present invention relates generally to equalization in communications systems, and more specifically, to a universal receiver incorporating a RAKE receiver and a hybrid equalizer.

2. Background

Communications systems are used for transmission of information from one device to another. Prior to transmission, information is encoded into a format suitable for transmission over a communication channel. The transmitted signal is distorted as it travels through the communication channel; the signal also experiences degradation from noise and interference picked up during transmission. An example of interference commonly encountered in band-limited channels is called inter-symbol interference (ISI). ISI occurs as a result of the spreading of a transmitted symbol pulse due to the dispersive nature of the channel, which results in an overlap of adjacent symbol pulses. The received signal is decoded and translated into the original pre-encoded form. Both the transmitter and receiver are designed to minimize the effects of channel imperfections and interference. For the purposes of this disclosure, interference or distortion due to channel imperfections, or any combination thereof will be referred to generally as noise.

Various receiver designs may be implemented to compensate for noise caused by the transmitter and the channel. By way of example, an equalizer is a common choice for dealing with ISI. An equalizer corrects for distortions and generates an estimate of the transmitted symbol. In the wireless environment, equalizers are required to handle time-varying channel conditions. Ideally, the response of the equalizer adjusts to changes in channel characteristics.

Equalizers are generally complex, tending to increase the power consumption of a communication device. A need exists, therefore, for an equalizer design that reduces power consumption. Further, there is a need for controlling an equalizer so as to operate the equalizer during such channel conditions as result in optimum performance of the equalizer. Still further there is a need to implement an equalizer in parallel with a RAKE receiver, wherein the equalizer only operates during specified operating conditions.

DETAILED DESCRIPTION

Figure 1:
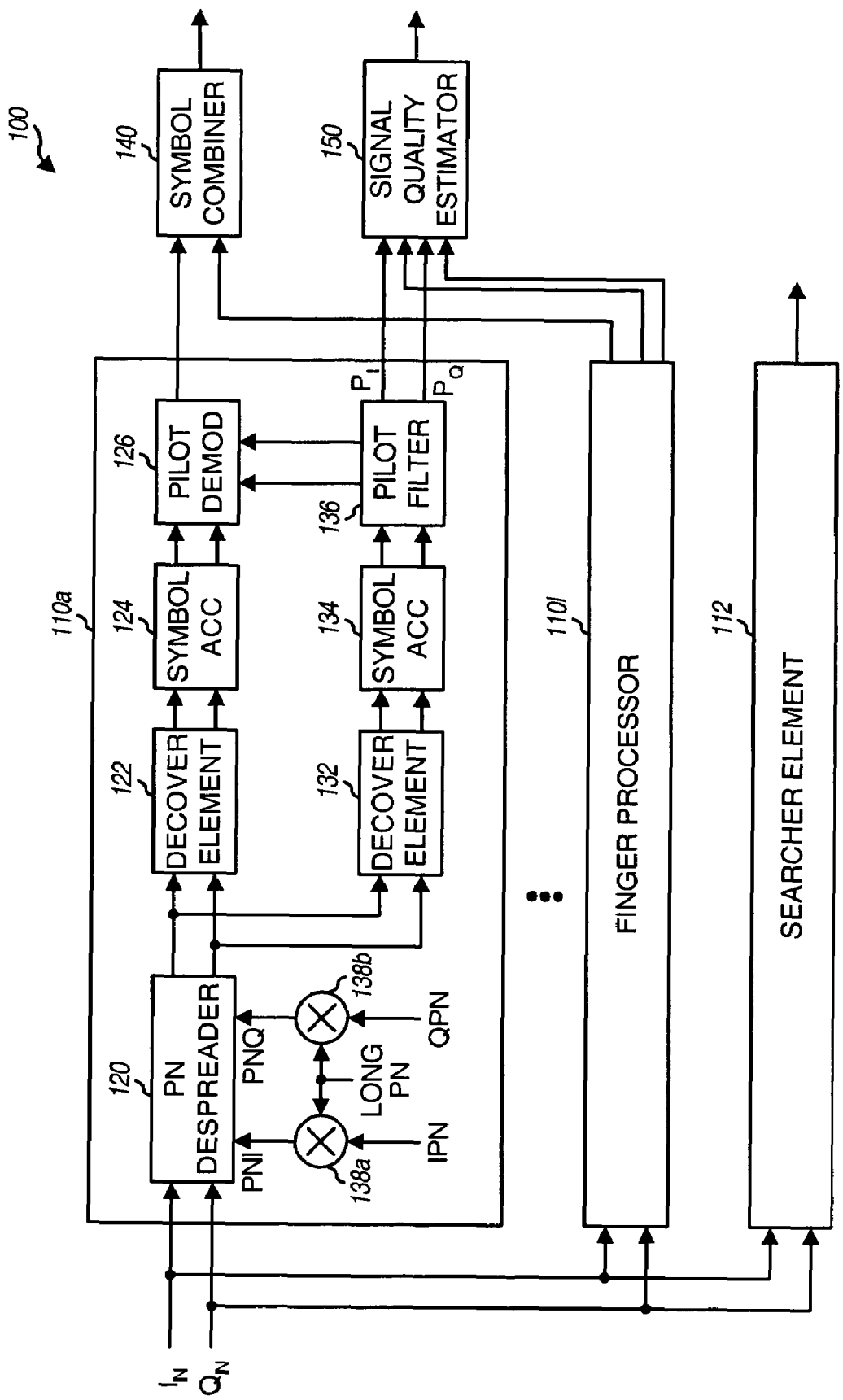
FIG. 1 is a portion of a rake receiver in a communication system.

The word "exemplary" is used herein to mean "serving as an example, instance, or illustration." Any embodiment described herein as "exemplary" is not necessarily to be construed as preferred or advantageous over other embodiments.

Communications systems are used for transmission of information from one device to another. Before transmission, information is encoded into a format suitable for transmission over a communication channel. The communication channel may be a transmission line or free space between the transmitter and the receiver. As the signal propagates through the channel, the transmitted signal is distorted by imperfections in the channel. Furthermore, the signal experiences degradation from noise and interference picked up during transmission. An example of interference commonly encountered in band-limited channels is called inter-symbol interference (ISI). ISI occurs as a result of the spreading of a transmitted symbol pulse due to the dispersive nature of the channel, which results in an overlap of adjacent symbol pulses. At the receiver, the signal is processed and translated into the original pre-encoded form. Both the transmitter and receiver are designed to minimize the effects of channel imperfections and interference. For the purposes of this disclosure, interference or distortion due to channel imperfections, or any combination thereof will be referred to generally as noise.

Various receiver designs may be implemented to compensate for noise caused by the transmitter and the channel. In one design, a RAKE receiver is implemented. In another design an equalizer is used. In still another design a RAKE receiver and an equalizer are both implemented.

RAKE Configuration

A communication system may employ a RAKE receiver to process a modulated signal transmitted on the forward link or reverse link. The RAKE receiver typically includes a searcher element and a number of finger processors. The searcher element searches for strong instances of the received signal (or multipaths). The finger processors are assigned to process the strongest multipaths to generate demodulated symbols for those multipaths. The RAKE receiver then combines the demodulated symbols from all assigned finger processors to generate recovered symbols that are estimates of the transmitted data. The RAKE receiver efficiently combines energy received via multiple signal paths.

The RAKE receiver provides an acceptable level of performance for CDMA systems operated at low signal-to-noise ratio (S/N). For CDMA systems designed to transmit data at high data rates, such as the HDR system, higher S/N is required. To achieve the higher S/N, the components that make up the noise term N need to be reduced. The noise term includes thermal noise (No), interference (Io) due to transmissions by other transmitting sources and transmissions for other users, and inter-symbol interference (ISI) that can come from multipath and distortion in the transmission channel. For CDMA systems designed to operate at low S/N, the ISI component is typically negligible compared to other noise components. However, for CDMA systems designed to operate at higher S/N, the other noise components (e.g., interference from other transmission sources) are typically reduced and ISI becomes a non-negligible noise component that may have a large impact on the overall S/N.

As noted above, the RAKE receiver provides acceptable performance when the S/N of the received signal is low. The RAKE receiver can be used to combine energy from various multipaths, but generally does not remove the effects of ISI (e.g., from multipath and channel distortion). Thus, the RAKE receiver may not be capable of achieving the higher S/N required by systems operating at higher data rates.

FIG. 1 is a block diagram of an embodiment of rake receiver 100. Due to multipath and other phenomena, a transmitted signal may reach a receiver unit via multiple signal paths. For improved performance, the rake receiver is designed with the capability to process multiple (and strongest) instances of the received signal (or multipaths). For a conventional rake receiver design, a number of finger processors 110 are provided to process a number of multipaths. Each finger processor 110 comprises a finger of the rake receiver and can be assigned to process a particular multipath.

In a spread-spectrum communication system, such as a Code Division Multiple Access (CDMA) system, the received In-phase ($I_{IN}$) and Quadrature ($Q_{IN}$) samples from a particular pre-processor (not shown) are provided to a number of finger processors 110a through 110l. Within each assigned finger processor 110, the received $I_{IN}$ and $Q_{IN}$ samples are provided to a PN despreader 120, which also receives a complex PN sequence, PNI and PNQ. The complex PN sequence is generated in accordance with the particular design of the CDMA system being implemented and, for the HDR system, is generated by multiplying the short IPN and QPN sequences with the long PN sequence by multipliers 138a and 138b. The short IPN and QPN sequences are used to spread the data at the transmitting base station, and the long PN sequence is assigned to the recipient receiver unit and used to scramble the data. The PNI and PNQ sequences are generated with a time offset corresponding to the particular multipath being processed by that finger processor.

PN despreader 120 performs a complex multiply of the complex $I_{IN}$ and $Q_{IN}$ samples with the complex PN sequence and provides complex despread $I_{DES}$ and $Q_{DES}$ samples to decover elements 122 and 132. Decover element 122 decovers the despread samples with one or more channelization codes (e.g., Walsh codes) that were used to cover the data and generates complex decovered samples. The decovered samples are then provided to a symbol accumulator 124 that accumulates the samples over the length of the channelization codes to generate decovered symbols. The decovered symbols are then provided to a pilot demodulator 126.

For a High Rate Packet Data (HRPD) system, such as specified by IS-856, a pilot reference is transmitted during a portion of the forward link transmission. Thus, decover element 132 decovers the despread samples with the particular channelization code (e.g., a Walsh code 0 for the HDR system) that was used to cover the pilot reference at the base station. The decovered pilot samples are then provided to an accumulator 134 and accumulated over a particular time interval to generate pilot symbols. The accumulation time interval can be the duration of the pilot channelization code, an entire pilot reference period, or some other time interval. The pilot symbols are then provided to a pilot filter 136 and used to generate pilot estimates that are provided to pilot demodulator 126. The pilot estimates are estimated or predicted pilot symbols for the time period when data is present.

Pilot demodulator 126 performs coherent demodulation of the decovered symbols from symbol accumulator 124 with the pilot estimates from pilot filter 136 and provides demodulated symbols to a symbol combiner 140. Coherent demodulation can be achieved by performing a dot product and a cross product of the decovered symbols with the pilot estimates. The dot and cross products effectively perform a phase demodulation of the data and further scale the resultant output by the relative strength of the recovered pilot. The scaling with the pilots effectively weighs the contributions from different multipaths in accordance with the quality of the multipaths for efficient combining. The dot and cross products thus perform the dual role of phase projection and signal weighting that are characteristics of a coherent rake receiver.

Symbol combiner 140 receives and coherently combines the demodulated symbols from all assigned finger processors 110 to provide recovered symbols for a particular received signal being processed by the rake receiver. The recovered symbols for all received signals may then be combined, as described below, to generate overall recovered symbols that are then provided to the subsequent processing element.

Searcher element 112 can be designed to include a PN despreader, a PN generator, and a signal quality measurement element. The PN generator generates the complex PN sequence at various time offsets, possibly as directed by a controller (not shown), which are used in the search for the strongest multipaths. For each time offset to be searched, the PN despreader receives and despreads the $I_{IN}$ and $Q_{IN}$ samples with the complex PN sequence at the particular time offset to provide despread samples. The signal quality of the despread samples is then estimated. This can be achieved by computing the energy of each despread sample (i.e., $I_{DES}^2 + Q_{DES}^2$) and accumulating the energy over a particular time period (e.g., the pilot reference period). Searcher element performs the search at numerous time offsets, and the multipaths having the highest signal quality measurements are selected. The available finger processors 110 are then assigned to process these multipaths.

The design and operation of a rake receiver for a CDMA system is described in further detail in U.S. Pat. No. 5,764,687, entitled "MOBILE DEMODULATOR ARCHITECTURE FOR A SPREAD SPECTRUM MULTIPLE ACCESS COMMUNICATION SYSTEM," and U.S. Pat. No. 5,490,165, entitled "DEMODULATION ELEMENT ASSIGNMENT IN A SYSTEM CAPABLE OF RECEIVING MULTIPLE SIGNALS," both assigned to the assignee of the present invention.

In one embodiment, a number of forward link signals are received by k antennas and processed to generate sample streams $x_1(n)$ through $X_K(n)$. Thus, a number of rake receivers may be provided to process the k sample streams. A combiner may then be used to combine the recovered symbols from all received signals being processed. Alternatively, one or more rake receivers can be time division multiplexed to process the K sample streams. In such a Time Division Multiplex (TDM) rake receiver architecture, the samples from the k streams may be temporarily stored to a buffer and later retrieved and processed by the rake receiver.

For each received signal, rake receiver 100 may be operated to process up to L multipaths, where 1 represents the number of available finger processors 110. Each of the L multipaths corresponds to a particular time offset identified with the assistance of searcher element 112. A controller or searcher element 112 may be designed to maintain a list of the magnitude of the strongest multipath ($\alpha_{j,i}$) and corresponding time offset ($\tau_i$) for each of the k received signals being processed.

In the combination receiver configuration having a RAKE and an equalizer, these magnitudes and time offsets can be used to initialize the coefficients and scaling factors of equalizer, as described above. In one implementation, the magnitude of each multipath of interest can be computed as the square root of the accumulated energy value divided by the number of samples (N) used in the accumulation.

Equalizer Configuration

An equalizer is a common choice for dealing with ISI. An equalizer may be implemented with a transversal filter, i.e. a delay line with T-second taps (where T is the symbol duration). The contents of the taps are amplified and summed to generate an estimate of the transmitted symbol. The tap coefficients are adjusted to reduce interference from symbols that are adjacent in time to the desired symbols. Commonly, an adaptive equalization technique is employed whereby the tap coefficients are continually and automatically adjusted. The adaptive equalizer uses a prescribed algorithm, such as Least Mean Square (LMS) or Recursive Least Squares (RLS), to determine the tap coefficients. The symbol estimate is coupled to a decision-making device such as a decoder or a symbol slicer.

The ability of a receiver to detect a signal in the presence of noise is based on the ratio of the received signal power and the noise power. This ratio is commonly known as the signal-to-noise power ratio (SNR), or the carrier-to-interference ratio (C/I). Industry usage of these terms, or similar terms, is often interchangeable, however, the meaning is the same. Accordingly, any reference to C/I herein will be understood by those skilled in the art to encompass the broad concept of measuring the effects of noise at various points in the communications system.

Typically, the C/I may be determined in the receiver by evaluating symbol estimates of a known transmitted symbol sequence. This may be accomplished in the receiver by computing the C/I for the transmitted pilot signal. Since the pilot signal is known, the receiver may compute the C/I based on the symbol estimates from the equalizer. The resultant C/I computation may be used for a number of purposes. In communications systems employing a variable rate data request scheme, the receiver may communicate to the transmitter the maximum data rate it may support based on the C/I. Furthermore, if the receiver includes a turbo decoder, then depending on the transmitted constellation, the Log Likelihood Ratio (LLR) computation needs an accurate estimate of the C/I.

Equalizers in wireless communication systems are designed to adjust to time varying channel conditions. As the channel characteristics change, the equalizer adjusts its response accordingly. Such changes may include variations in the propagation medium or the relative motion of the transmitter and receiver, as well as other conditions. As discussed hereinabove, adaptive filtering algorithms are often used to modify the equalizer tap coefficients. Equalizers that employ adaptive algorithms are generally referred to as adaptive equalizers. Adaptive algorithms share a common property: adaptation speed decreases as the number of equalizer taps increases. Slow adaptation impacts the tracking behavior of adaptive equalizers. A "long" equalizer, i.e., an equalizer having a large number of taps, is desirable as long equalizers more accurately invert channel distortions resulting in good steady state performance. Long equalizers, however, react more slowly to channel variations leading to poor transient behavior, i.e., poor performance when the channel is rapidly varying. An optimum number of taps balances such considerations and compromises between good steady-state performance and good transient performance.

In practice, determining the optimum number of taps is difficult as the optima depends on a variety of conditions and goals, including but not limited to, the instantaneous response of the channel, and the rate of variation of the channel. So it is difficult to determine, a priori, the optimum number of taps if the equalizer is to be used on a variety of channels, in a variety of time-varying conditions.

Figure 2A:
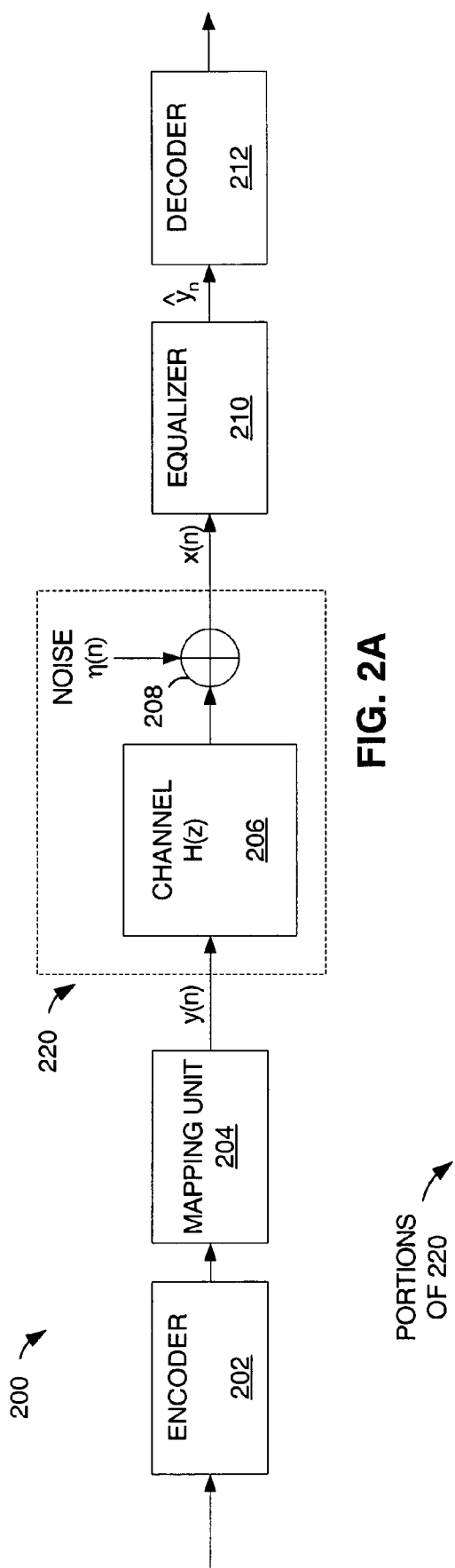
FIG. 2A is model of a communication system.

FIG. 2A illustrates a portion of the components of a communication system 200. Other blocks and modules may be incorporated into a communication system in addition to those blocks illustrated. Bits produced by a source (not shown) are framed, encoded, and then mapped to symbols in a signaling constellation. The sequence of binary digits provided by the source is referred to as the information sequence. The information sequence is encoded by encoder 202 which outputs a bit sequence. The output of encoder 202 is provided to mapping unit 204, which serves as the interface to the communication channel. The mapping unit 204 the encoder output sequence into symbols γ(n) in a complex valued signaling constellation. Further transmit processing, including modulation blocks, as well as the communication channel and analog receiver processing, are modeled by section 220.

Figure 2B:
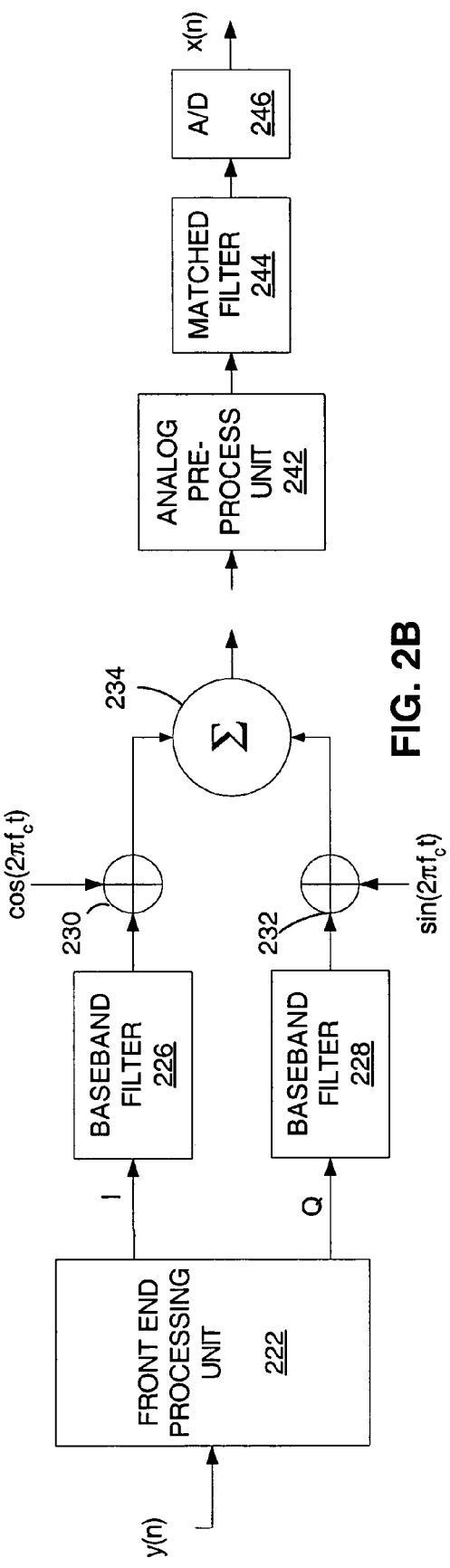
FIG. 2B is a model of a transmission portion of a communication system, including modulation and analog receiver processing.

FIG. 2B illustrates some of the details included within section 220 of FIG. 2A. As illustrated in FIG. 2B, the complex symbols γ(n) are modulated onto an analog signal pulse, and the resulting complex baseband waveform is sinuosoidally modulated onto the in-phase and quadrature-phase branches of a carrier signal. The resulting analog signal is transmitted by an RF antenna (not shown) over a communication channel. A variety of modulation schemes may be implemented in this manner, such as M-ary Phase Shift Keying (M-PSK), $2^M$-ary Quadrature Amplitude Modulation ($2^M$ QAM), etc.

Each modulation scheme has an associated "signaling constellation" that maps one or more bits to a unique complex symbol. For example, in 4-PSK modulation, two encoded bits are mapped into one of four possible complex values {1,i ,−1,−i}. Hence each complex symbol γ(n) may take on four possible values. In general for M-PSK, $\log_2 M$ encoded bits are mapped to one of M possible complex values lying on the complex unit circle.

Continuing with FIG. 2A, at the receiver, the analog waveform is down-converted, filtered and sampled, such as at a suitable multiple of the Nyquist rate. The resulting samples are processed by the equalizer 210, which corrects for signal distortions and other noise and interference introduced by the channel, as modeled by section 220. The equalizer 210 outputs estimates of the transmitted symbols $\tilde{\gamma}(n)$. The symbol estimates are then processed by a decoder 212 to determine the original information bits, i.e., the source bits that are the input to encoder 202.

The combination of a pulse-filter, an I-Q modulator, the channel, and an analog processor in the receiver's front-end, illustrated in FIG. 2A and FIG. 2B, is modeled by a linear filter 206 having an impulse response $\{h_k\}$ and a z-transform H(z), wherein the interference and noise introduced by the channel are modeled as Additive White Gaussian Noise (AWGN), and coupled to multiplier 208.

FIG. 2B details processing section 220 as including a front end processing unit 222 coupled to baseband filters 226 and 228 for processing the In-phase (I) and Quadrature (Q) components, respectively. Each baseband filter 226, 228 is then coupled to a multiplier (230, 232) for multiplication with a respective carrier. The resultant waveforms are then summed at summing node 234 and transmitted over the communication channel to the receiver. At the receiver, an analog pre-processing unit 242 receives the transmitted signal, which is processed and passed to a matched filter 244 The output of the matched filter 244 is then provided to an Analog/Digital (A/D) converter 246. Note that other modules may be implemented according to design and operational criteria. The components and elements of FIGS. 2A and 2B are provided for an understanding of the following discussion and are not intended to be a complete description of a communication system.

RAKE and Equalizer Combination

In another design, a RAKE receiver is operated in parallel with an equalizer. Such a design is detailed in "METHOD AND APPARATUS FOR PROCESSING A MODULATED SIGNAL USING AN EQUALIZER AND A RAKE RECEIVER," by John Smee et al., having application Ser. No. 09/624,319, filed Jul. 24, 2000. A selection is made between the RAKE receiver and the equalizer to determine the best estimate of the received signal. For example, the selection may correspond to the lowest Mean Square Error (MSE) between a transmitted pilot signal and the estimate, or the highest Signal to Interference and Noise Ratio (SINR) at each output, or some other criteria. The performance measure or estimate provides a means for comparing the RAKE and the equalizer. The selected receiver configuration is then used for processing the received data signal.

A receiver is termed "universal" if its performance is optimum over the "universe" of possible channel conditions and rates of channel variation. The receiver with a RAKE and an equalizer is "universal" if the receiver configuration selected on the basis of the MSE estimate or C/I estimate is, in fact, the best configuration among the two configurations. Thus accurate MSE estimates or C/I estimates are necessary to make a receiver "universal."

Figure 3:
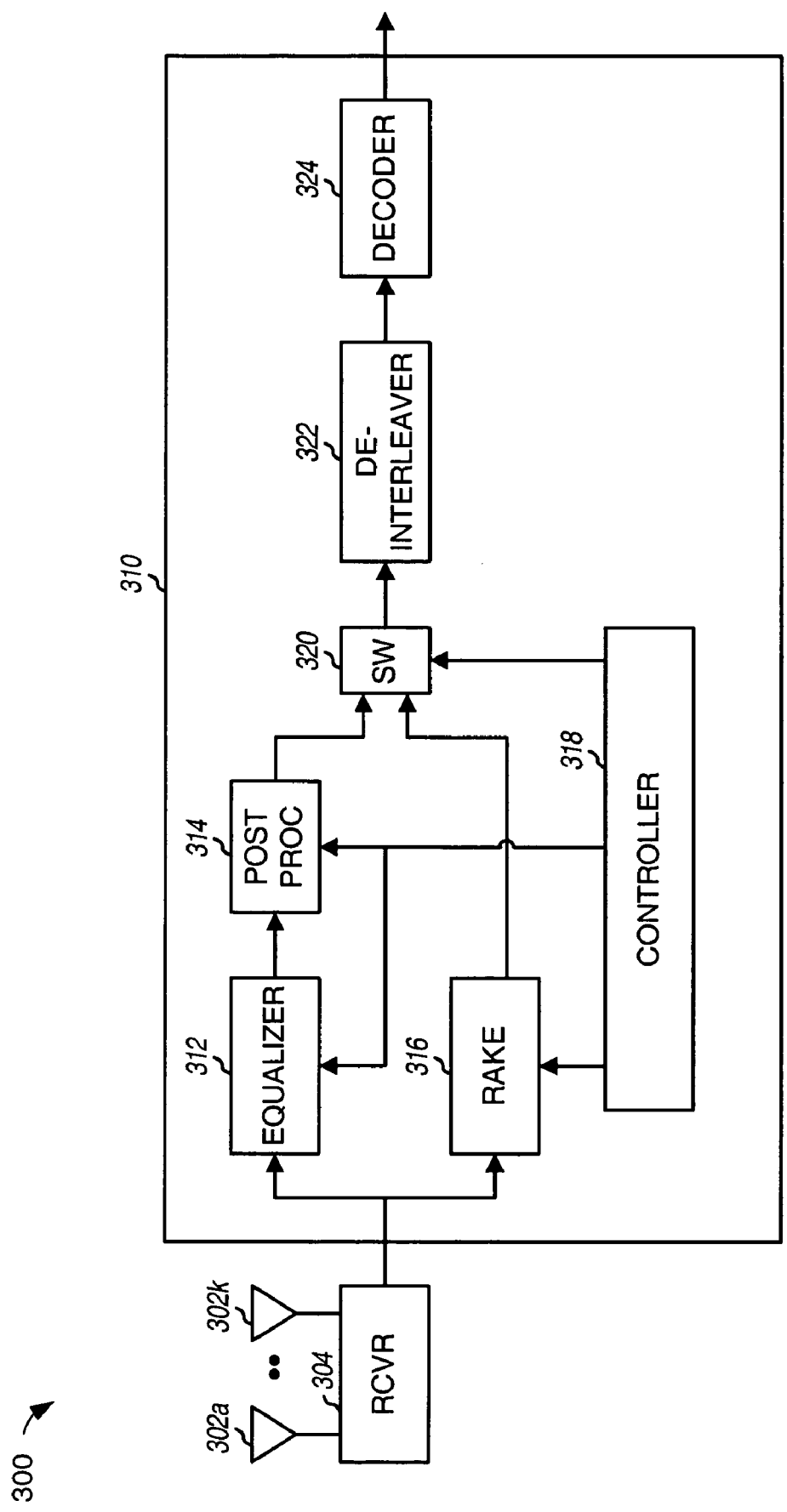
FIG. 3 is receive data processor in a mobile station.

FIG. 3 is a block diagram of receive data processor 310 within a mobile station 300 in accordance with an embodiment of the invention. In this embodiment, receive data processor 310 includes two signal processing paths that can be operated in parallel to provide improved performance, especially at higher data rates. The first signal processing path includes an equalizer 312 coupled to a post processor 314 and the second signal processing path includes a RAKE 316.

Within receive data processor 310, the streams of samples from pre-processors (not shown) are provided to each of equalizer 312 and RAKE 316. Each stream of samples is generated from a respective received signal, wherein the received signal is routed from antennas 302 to receiver 304. Equalizer 312 performs equalization on the received streams of samples and provides symbol estimates to post processor 314. Depending on the processing performed at transmission, post processor 314 may further process the symbol estimates to provide recovered symbols. In particular, if PN spreading and covering are performed at the transmitter unit, post processor 314 may be configured to perform despreading with a complex PN sequence and decovering with one or more channelization codes. Phase rotation (which is achieved via pilot demodulation for a rake receiver) is implicitly achieved by equalizer 312 after the filter coefficients have been adopted.

RAKE 316 may be configured to process one or more multipaths of each received signal to provide recovered symbols for that received signal. For each stream of samples, RAKE 316 may be configured to perform PN despreading, decovering, and coherent demodulation for a number of multipaths. RAKE 316 then combines demodulated symbols for all multipaths of a received signal to generate recovered symbols for that received signal. RAKE 316 may further combine the recovered symbols for all received signals to provide the overall recovered symbols that are provided from the rake receiver.

The recovered symbols from post processor 314 and RAKE 316 may be provided to a switch (SW) 320 that selects the recovered symbols from either post processor 314 or RAKE 316 to provide to a de-interleaver 322. The selected recovered symbols are then reordered by de-interleaver 322 and subsequently decoded by a decoder 324. A controller 318 couples to, and manages the operation of equalizer 312, post processor 314, rake receiver 316, and switch 320.

In accordance with the invention, equalizer 312 may be used to provide equalization of the received signals to reduce the amount of ISI in the received signals. Each received signal is distorted by the characteristics of the transmitter unit, the transmission channel, and the receiver unit. Equalizer 312 may be operated to equalize the overall response for each received signal, thus reducing the amount of ISI. The lower ISI improves S/N and may support higher data rates.

Continuing with FIG. 3, receive data processor 310 includes two signal processing paths that can be operated to process the received signals. The first signal processing path includes equalizer 310 and post processor 314, and the second signal processing path includes RAKE 316. In an embodiment, the two signal processing paths can be operated in parallel (e.g., during the adaptation period) and a signal quality estimate can be computed for each of the signal processing paths. The signal processing path that provides the better signal quality can then be selected to process the received signals.

For a conventional RAKE, the received signal quality can be estimated by computing the signal-to-noise (SIN) ratio. For CDMA systems that transmit TDM pilot reference, the S/N can be computed during the pilot reference period when the received signal is known. A signal quality estimate can be generated for each assigned finger processor. The estimates for all assigned finger processors can then be weighted and combined to generate an overall S/N, which can be computed as:

$$S/N_{RAKE} = \frac{\left(\sum_{i=1}^{K} \beta_i \cdot \sqrt{Es_i}\right)^2}{\sum_{i=1}^{K} \beta_i^2 \cdot Nt_i} \quad \text{Eq. (1)}$$

where β is the weighting factors used by the rake receiver to combine the demodulated symbols from the assigned finger processors to provide the recovered symbols that are improved estimates of the transmitted data, Es is the energy-per-symbol for the desired signal (e.g., the pilot) and Nt is the total noise on the received signal being processed by the finger processor. Nt typically includes thermal noise, interference from other transmitting base stations, interference from other multipaths from the same base station, and other components. The energy-per-symbol can be computed as:

$$Es = \frac{1}{N_{SYM}} \sum_{i=1}^{N_{SYM}} (P_I^2(i) + P_Q^2(i)), \quad \text{Eq. (2)}$$

where $P_I$ and $P_Q$ are the in phase and quadrature filtered pilot symbols and $N_{SYM}$ is the number of symbols over which the energy is accumulated to provide the Es value. The filtered pilot symbols can be generated by accumulating the despread samples over the length of the channelization code used to cover the pilot reference. The total noise can be estimated as the energy of the variations in the energy of the desired signal, which can be computed as:

$$Nt = \frac{1}{N_{SYM} - 1} \left\{ \sum_{i=1}^{N_{SYM}} (P_I^2(i) + P_Q^2(i)) - \right. \quad \text{Eq. (3)}$$

$$\frac{1}{N_{SYM}} \left( \sum_{i=1}^{N_{SYM}} P_I(i) \right)^2 - \frac{1}{N_{SYM}} \left( \sum_{i=1}^{N_{SYM}} P_Q(i) \right)^2 \right\}.$$

The measurement of the received signal quality is described in further detail in U.S. Pat. No. 5,903,554, entitled "METHOD AND APPARATUS FOR MEASURING LINK QUALITY IN A SPREAD SPRECTRUM COMMUNICATION SYSTEM," and U.S. Pat. No. 5,799,005, entitled "SYSTEM AND METHOD FOR DETERMINING RECEIVED PILOT POWER AND PATH LOSS IN A CDMA COMMUNICATION SYSTEM," both assigned to the assignee of the present invention.

For the signal processing path that includes equalizer 312, the signal quality may be estimated using various criteria, including a mean square average (MSE). Again, for CDMA systems that transmit TDM pilot reference, the MSE can be estimated during the pilot reference period, and can be computed as:

$$MSE = \frac{1}{N_{SAM}} \sum_{n=1}^{N_{SAM}} |y(n) - \hat{y}(n)|^2, \qquad \text{Eq. (4)}$$

where $N_{SAM}$ is the number of samples over which the error is accumulated to provide the MSE. Typically, the mean square error is averaged over a number of samples, and over one or more pilot references, to obtain a desired level of confidence in the measurement. The mean square error can then be translated to an equivalent signal-to-noise ratio, which can be expressed as:

$$S/N_{EQ} = \frac{1}{MSE} - 1 \quad \text{linear} \qquad \text{Eq. (5)}$$
$$= 10 \log \left( \frac{1}{MSE} - 1 \right) \text{ dB}$$

The $S/N_{EQ}$ for the signal processing path with equalizer 312 can be compared with the $S/N_{RAKE}$ for the signal processing path with RAKE 316. The signal processing path that provides the better S/N can then be selected to process the received signals.

Alternatively, the MSE can be computed for the signal processing path with RAKE 316 and compared against the MSE computed for the signal processing path with equalizer 312. The signal processing path with the better MSE may then be selected.

For a HRPD system, the S/N is estimated at a remote terminal and used to determine a maximum data rate that can be received by the remote terminal for the operating conditions. The maximum data rate is then transmitted back to the base station for which the S/N is estimated. Thereafter, that base station transmits to the remote terminal at a data rate up to identified maximum data rate.

With the present invention, the data rate for a data transmission can be estimated using various methods. In one method, the S/N can be estimated for the RAKE or for the equalizer based on the computed MSE. The best S/N from all signal processing paths can then be used to determine a maximum data rate that can be supported. Alternatively, the MSE can be used to directly determine the maximum data rate. The best S/N, MSE, or maximum data rate can be sent to the base station.

Under certain operating conditions, the signal processing path with the equalizer can provide better performance than the one with the rake receiver. For example, the signal processing path with the equalizer typically performs better when the S/N is high and for channels with ISI. The RAKE can be used to process multipaths, which also cause ISI. In fact, the RAKE can be viewed as a filter with L taps (where L corresponds to the number of finger processors), with each tap corresponding to a time delay that can be adjusted. However, the RAKE is not as effective at reducing ISI due to frequency distortion in the received signals.

The equalizer may more effectively reduce ISI due to frequency distortion. This is achieved by providing a response that is approximately the inverse of the frequency distortion while attempting to minimize the overall noise, which includes the ISI. The equalizer thus "inverts" the channel and also attempts to smooth out the effect of multipath. In fact, each filter, when the coefficients are initialized to $\{0, \ldots, 0, 1, 0, \ldots, 0\}$, is equivalent to one finger processor. Subsequently, as the zero-valued coefficients are adapted, the filter frequency response is altered to equalize the channel distortion. Thus, the equalizer may be used to effectively deal with both multipath-induced ISI and channel-induced ISI.

For simplicity, many of the aspects and embodiments of the invention have been described for a spread spectrum communication system. However, many of the principles of the invention described herein can be applied to non- spread spectrum communication systems, and communication systems capable of selectively performing direct sequence spreading, such as the HRPD system.

RAKE and Hybrid Equalizer Configuration

According to one embodiment, the equalizer 312 may be a hybrid equalizer, wherein equalizer 312 is turned on when operating conditions, including but not limited to channel conditions, encourage the user of an equalizer. In other words, when the equalizer 312 is expected to perform as well as or better than the RAKE 316, then the equalizer 312 is turned on. Else, the equalizer is not operated. In this way, the system experiences power savings during those times when the equalizer is expected to perform worse than the RAKE 316. Such an equalizer is referred to as a "hybrid" equalizer, as the equalizer is responsive to operating conditions.

A hybrid equalizer and RAKE receiver architecture operates by comparing an operating condition metric, such as the potential demodulation SINR outputs of a RAKE and equalizer, and then selecting the mode that achieves the best performance. Modes may include, but are not limited to, RAKE only mode, and RAKE and equalizer mode. One embodiment includes a test mode to periodically run the equalizer and select between the RAKE only and RAKE and equalizer modes. The hybrid equalizer will typically have better performance for higher geometry and slow fading conditions. In such conditions, the equalizer offers performance gains as compared to a conventional RAKE only design. In the simplest implementation, however, the cost of running both methods may be prohibitive, incurring increased power dissipation even for those conditions for which the equalizer offers no gain over the RAKE.

Ideally the equalizer only operates when gains in performance may be realized. The hybrid equalizer provides power reduction by employing a decision algorithm based on short temporal operating conditions, such as correlation statistics and/or receiver SINR. The hybrid equalizer is operated only when the channel conditions are likely to yield performance gains.

As the equalizer relies on slow fading channel conditions, one embodiment estimates fading dynamics by estimating the inter-pilot burst correlation statistics. An equalizer typically yields gains for higher geometry (i.e., SINR), wherein another embodiment estimates SINR from the pilot burst. The two metrics may both be used in a decision algorithm. If the correlation metric is above a given threshold and the SINR is also above another threshold, then the equalizer is enabled otherwise the equalizer is disabled. This reduces the power dissipation by avoiding the use of the equalizer when no benefit is achieved.

Figure 5:
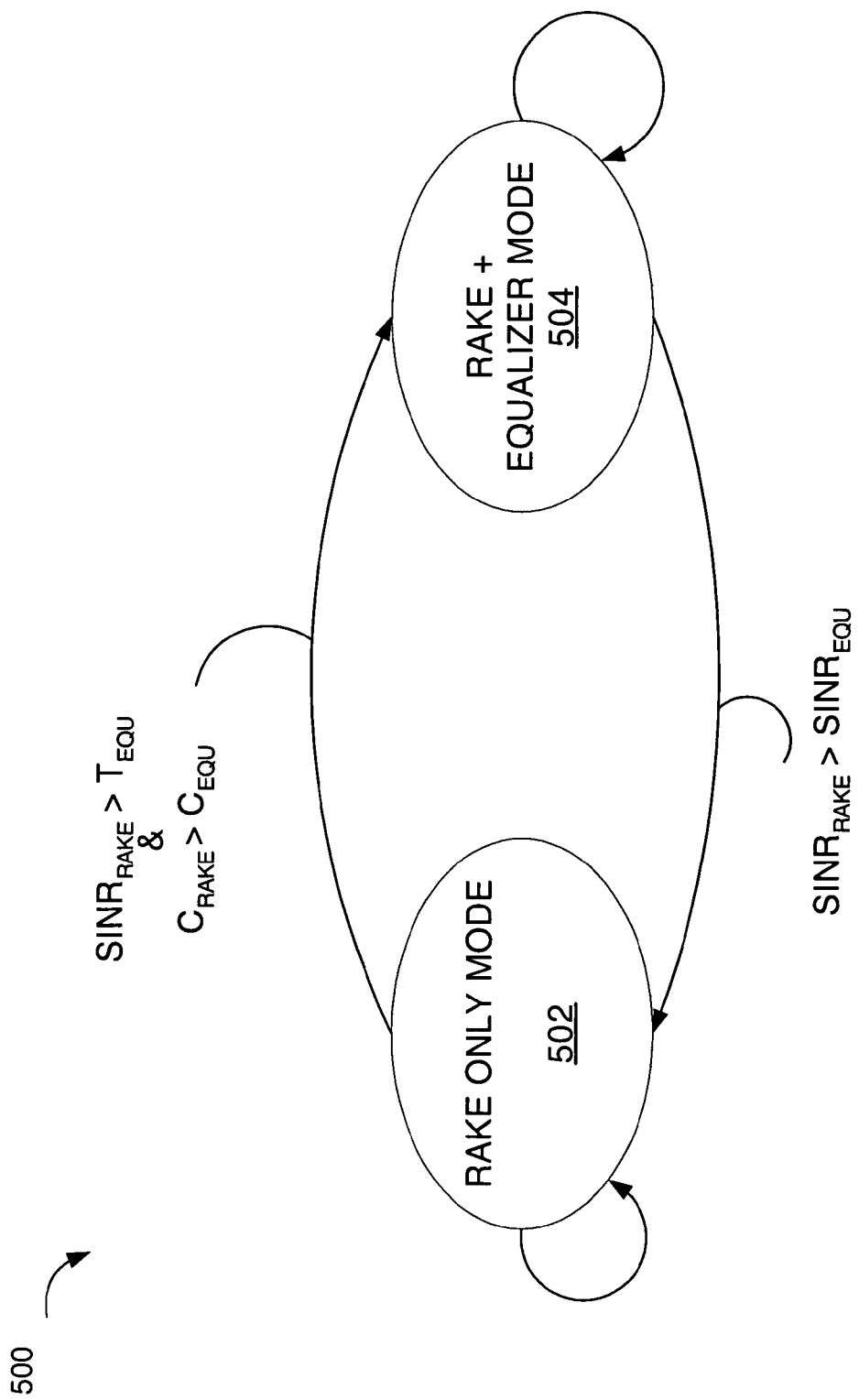
FIG. 5 is a state diagram illustrating operation of a receiver employing a RAKE and hybrid equalizer.

FIG. 5 is a state diagram illustrating operation 500 of a receiver according to one embodiment implementing a RAKE and hybrid equalizer. Two modes are implemented: RAKE only mode 502; and RAKE and hybrid equalizer mode 504. Operation starts in the RAKE only mode. While in mode 502, operation is maintained in mode 502 until there is a change in operating conditions sufficient to indicate performance increases would be achieved with addition of the equalizer. To determine if operating conditions have changed sufficiently, such as a slowly varying channel condition, a channel quality metric is evaluated. In the present embodiment, the channel quality metric is the Signal to Interference and Noise Ratio (SINR) of the RAKE output ($SINR_{RAKE}$) is measured and compared to a threshold value ($T_{EQU}$) for triggering the equalizer. Similarly, a correction metric ($C_{RAKE}$) is determined for the RAKE and compared to a corresponding correction metric ($C_{EQU}$) for the equalizer. When $SINR_{RAKE}$ is greater than $T_{EQU}$, and $C_{RAKE}$ is greater than $C_{EQU}$ then operation transitions to a RAKE and equalizer mode 504. In this way, when operating conditions encourage use of the equalizer, mode 504 is entered and the equalizer operation begins.

While in mode 504 the system continues to monitor the SINR of the RAKE output and the equalizer output ($SINR_{EQU}$). When $SINR_{RAKE}$ is greater than $SINR_{EQU}$, operation transitions to mode 502. The use of an equalizer is typically encouraged as the SINR increases, as SINR (as a function of current geometry of the system) indicates the channel condition. For low SINR, the equalizer does not perform as well, and therefore SINR acts as a good trigger for turning the equalizer on and off. The trigger for entering the mode 504, i.e., enabling the equalizer, is effectively a two-part consideration. The first evaluation determines if the channel condition, e.g., SINR, is consistent with those conditions for which equalizer operation improves performance. The second evaluation determines the speed of the channel, or in other words, how quickly a mobile station is moving in the cellular network. According to one embodiment, the second evaluation determines the cross-correlation between pilot bursts. Cross-correlation measures the degree to which two series are correlated. In this case, as the correlation of the signals increases, the delay between the two signals decreases. Similarly, the correlation decreases as the delay increases. Therefore, as the distance between the mobile station and the receiver increases, or changes, there is a decrease in the correlation of signals received. For a low cross-correlation, the equalizer is enabled in mode 504, else the RAKE only mode 502 is maintained. The cross-correlation may be measured on the pilot signal, or pilot burst, as this is a known signal providing confidence in the result.

As an example, consider the cross correlation metric as follows. Given a pilot symbol, Pμ, the correlation between successive pilot symbols may be estimated as:

$$C_{RAKE} = \left| \frac{\sum_{k=1}^{N_{SUM}} P_\mu P^*_{k+1}}{\sum_{\mu=1}^{N_{SUM}} P_\mu P^*_\mu} \right|$$ Eq. (6)

by averaging over $N_{SUM}$ pilot symbols. The correlation metric ranges from 0 to 1. Correlation of 1 implies a strong correlation and is likely to yield good equalizer performance, as the channel is not changing between successive pilot symbols.

Alternate embodiments may define other parameters and metrics, which trigger an equalizer. Metrics may be selected which provide an expected equalizer performance. The metrics may be selected specific to the system design and performance goals.

Figure 6:
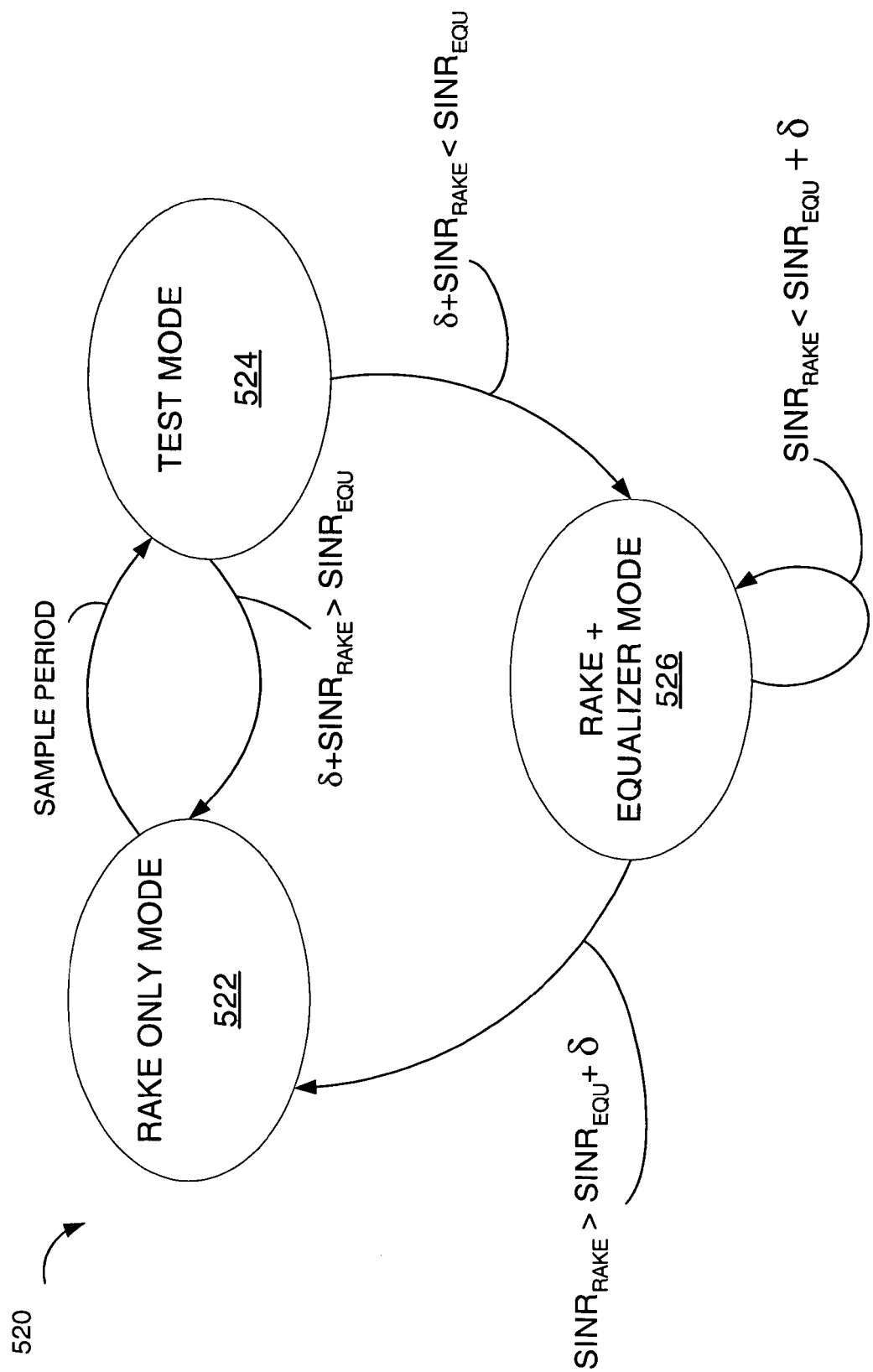
FIG. 6 is a state diagram illustrating operation of a receiver incorporating multiple operational states.

FIG. 6 is a state diagram of operation 520 for an alternate embodiment having three modes of operation. In a RAKE only mode 522 the RAKE is used while the equalizer is not operating. Periodically, measured by a sample period, which may be prespecified or adaptive, operation enters a test mode 524.

During the test mode 524, equalizer operation is enabled. The test mode 524 enables the equalizer to determine if the performance of the equalizer adds to the performance of the receiver. The results of the RAKE and equalizer are compared to evaluate performance of the equalizer. When $SINR_{RAKE}$ is less than $SINR_{EQU}$, operation transitions to RAKE and equalizer mode 526, wherein both the RAKE and equalizer are enabled. In this situation, the equalizer shows capacity for improving performance. If the results in test mode 524 indicate that $SINR_{RAKE}$ is greater than $SINR_{EQU}$, operation transitions back to mode 522 for RAKE only. In this situation the equalizer does not improve performance, and is not expected to provide an overall improvement in performance under the current conditions. Note, a margin value (δ) may be illustrated, wherein $SINR_{RAKE}$ or $SINR_{EQU}$ is biased according to system design and/or performance. The sample period may be designed as a function of the time required to operate the equalizer, wherein the sample period is sufficient to allow data to traverse the filter elements of the equalizer.

While in mode 526, the system monitors the channel quality metric. When $SINR_{RAKE}$ is greater than $SNR_{EQU}$, operation transitions to RAKE only mode 522. Note that transitions implement a margin value (δ) so as to avoid toggling between modes. In this way, transitions from mode 524 to mode 526 occur when the SINR of the estimate generated by the equalizer exceeds the SINR generated by the RAKE by more than a margin. Similarly, transitions from mode 524 to mode 522 occur when the SINR of the estimate generated by the RAKE exceeds the SINR generated by the equalizer by more than a margin. Additionally, transitions from mode 526 to mode 522 occur when the SINR of the estimate generated by the RAKE exceeds the SINR generated by the equalizer by more than a margin.

High Rate Packet Data Communication Systems

Throughout the following discussion a specific high data rate system is described for clarity. Alternate systems may be implemented that provide transmission of information at high data rates. For CDMA communications systems designed to transmit at higher data rates, such as a High Rate Packet Data (HRPD) or High Data Rate (HDR) communications system, a variable data rate request scheme may be used to communicate at the maximum data rate that the C/I may support. The HDR communications system is typically designed to conform to one or more standards such as the "cdma2000 High Rate Packet Data Air Interface Specification," 3GPP2 C.S0024, Version 2, Oct. 27, 2000, promulgated by the consortium "$3^{rd}$ Generation Partnership Project."

Generally, in an HRPD system, an Access Network (AN) is defined as the network equipment providing data connectivity between a cellular network and a packet switched data network (typically the Internet) and the ATs. An AN in an HRPD system is equivalent to a base station in a cellular communication system. An Access Terminal (AT) is defined as a device providing data connectivity to a user. An AT in an HRPD system corresponds to a mobile station in a cellular communication system. An AT may be connected to a computing device such as a laptop personal computer or it may be a self-contained data device such as a Personal Digital Assistant (PDA). Note that the terms mobile station, remote terminal, and access terminal are used interchangeably.

Figure 4:
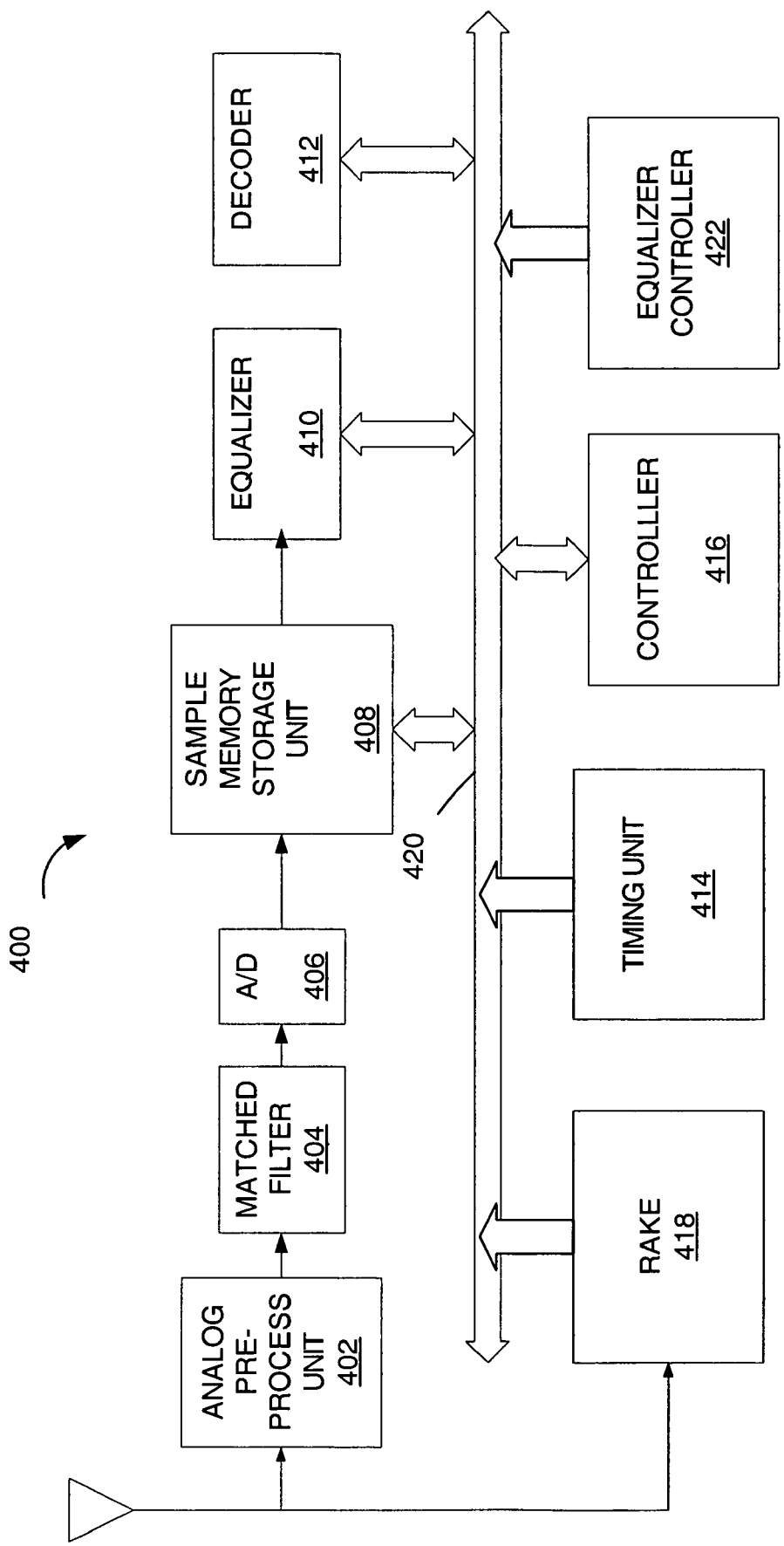
FIG. 4 is a receiver supporting data communications.

A receiver in an exemplary HDR communications system employing a variable rate data request scheme is shown in FIG. 4. The receiver 400 is a subscriber station in communication with a land-based data network by transmitting data on a reverse link to a base station (not shown). The base station receives the data and routes the data through a base station controller (BSC)(also not shown) to the land-based network. Conversely, communications to the subscriber station 400 may be routed from the land-based network to the base station via the BSC and transmitted from the base station to the subscriber unit on the forward link. The forward link refers to the transmission from the base station to the subscriber station and the reverse link refers to the transmission from the subscriber station to the base station.

In the exemplary HDR communications system, the forward link data transmission from the base station to the subscriber station 400 should occur at or near the maximum data rate which may be supported by the forward link. Initially, the subscriber station 400 establishes communication with the base station using a predetermined access procedure. In this connected state, the subscriber station 400 may receive data and control messages from the base station, and is able to transmit data and control messages to the base station. The subscriber station 400 then estimates the C/I of the forward link transmission from the base station 400. The C/I of the forward link transmission may be obtained by measuring the pilot signal from the base station. Based on the C/I estimation, the subscriber station 400 transmits to the base station a data rate request message as a Data Rate Control (DRC) message on an assigned DRC channel. The DRC message may contain the requested data rate or, alternatively, an indication of the quality of the forward link channel, e.g., the C/I measurement itself, the bit-error-rate, or the packet-error-rate. The base station uses the DRC message from the subscriber station 400 to efficiently transmit the forward link data at the highest possible rate.

The BSC (not shown) may interface with a packet network interface, a PSTN, and/or other base stations, and serves to coordinate the communication between subscriber stations and other users.

The forward link pilot channel provides a pilot signal, which may be used by the subscriber station 400 for initial acquisition, phase recovery, and timing recovery. In addition, the pilot signal may also be used by subscriber station 400 to perform the C/I measurement. In the described exemplary embodiment, each time slot on the forward link is 2048 chips long with two pilot bursts occurring at the end of the first and third quarters of the time slot. Each pilot burst is 96 chips in duration. Each slot has two parts, wherein each half slot includes a pilot burst.

The forward link transmission is received by an antenna at the subscriber station 400. The received signal is routed from the antenna to a receiver within analog preprocessing unit 402, matched filter 404, and Analog to Digital (A/D) converter 406. The receiver filters and amplifies the signal, downconverts the signal to baseband, quadrature demodulates the baseband signal, and digitizes the baseband signal. The digitized baseband signal is coupled to a demodulator. The demodulator includes carrier and timing recovery circuits and further includes the equalizer 410. The equalizer 410 compensates for ISI and generates symbol estimates from the digitized baseband signal. The symbol estimates are coupled to a controller 416 via communication bus 420. The controller then generates the DRC message. The output of the equalizer 410 is also provided to decoder 412. The decoder 412, the equalizer 410, and the controller 416 are each coupled to communication bus 420.

In addition to generating the DRC message, the controller 416 may be used to support data and message transmissions on the reverse link. The controller 416 may be implemented in a microcontroller, a microprocessor, a digital signal processing (DSP) chip, an ASIC programmed to perform the function described herein, or any other implementation known in the art. A timing unit 414 is also coupled to the communication bus 420. The exemplary embodiment includes a sample memory storage unit 408 coupled to the equalizer 410 and the controller 416 via the communication bus 420.

A RAKE 418 is also coupled to the communication bus 420 and receives inputs for processing via a structure such as illustrated in FIG. 1. An equalizer controller 422 receives the estimates from the RAKE 418, and from the hybrid equalizer 410 when operating. The equalizer controller 422 then determines when the equalizer is to be used and initiates operation. Similarly, equalizer controller 422 determines when the equalizer is not to be used and initiates termination of operation. Various monitoring units may be implemented to check operating metrics, such as channel quality and/or channel velocity. The equalizer controller 422 uses such information to make equalizer decisions.

Performance Measurement

As described hereinabove, the equalizer configuration may be selected based on a measurement of the SINR, C/I or other performance criteria. Other performance criteria may include, for example, the Mean Square Error of the equalizer configuration measured on the pilot samples. For example, if the equalizer outputs on pilot samples are given by $\{\hat{y}_n : n=1, \ldots, K\}$ and the desired pilot symbols are denoted by $\{y_n : n=1, \ldots, K\}$, the Mean Square Error (MSE) for this configuration is given by:

$$MSE = \frac{1}{K} \sum_{n=1}^{K} |\hat{y}_n - y_n|^2. \qquad \text{Eq. (7)}$$

One definition of the SINR or C/I estimate is the following:

$$SINR = \frac{1}{MSE} - 1. \qquad \text{Eq. (8)}$$

Other definitions or performance measures are also possible.

The models, methods, and apparatus presented hereinabove serve as examples of various embodiments supporting different systems, channel conditions, and receiver designs. The application of parallel equalizers as described hereinabove may be implemented in any of a variety of receivers adapted for operation in a variety of communication systems, including but not limited to high data rate systems.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving data in a wireless communication system, comprising:
    comparing a first metric associated with a RAKE processing element to a second metric associated with an equalizer, wherein said first and second metrics are respective wireless communication channel metrics; and
    based on said comparing, determining whether to transition from one of first and second modes of data reception to the other of said first and second modes of data reception;
    wherein said first mode of data reception is defined by a first combination of respective operational states of the RAKE processing element and the equalizer;
    wherein said second mode of data reception is defined by a second combination of respective operational states of the RAKE processing element and the equalizer;
    wherein said first combination of operational states differs from said second combination of operational states; and
    wherein said wireless communication channel metrics are channel speed metrics.

2. The method of claim 1, wherein each of said channel speed metrics includes signal correlation information.

3. A method of receiving data in a wireless communication system, comprising:
    comparing a first metric associated with a RAKE processing element to a second metric associated with an equalizer; and
    based on said comparing, determining whether to transition from one of first and second modes of data reception to the other of said first and second modes of data reception;
    wherein said first mode of data reception is defined by a first combination of respective operational states of the RAKE processing element and the equalizer;
    wherein said second mode of data reception is defined by a second combination of respective operational states of the RAKE processing element and the equalizer;
    wherein said first combination of operational states differs from said second combination of operational states; and
    wherein said comparing includes comparing one of said first and second metrics to a biased version of the other of said first and second metrics.

4. The method of claim 3, wherein said one metric is said first metric.

5. The method of claim 3, wherein said one metric is said second metric.

6. A method of receiving data in a wireless communication system, comprising:
    comparing a first metric associated with a RAKE processing element to a second metric associated with an equalizer; and
    based on said comparing, determining whether to transition from one of first and second modes of data reception to the other of said first and second modes of data reception;
    wherein said first mode of data reception is defined by a first combination of respective operational states of the RAKE processing element and the equalizer;
    wherein said second mode of data reception is defined by a second combination of respective operational states of the RAKE processing element and the equalizer;
    wherein said first combination of operational states differs from said second combination of operational states and;

wherein said one mode of data reception is a periodically activated test mode in which the RAKE processing element and the equalizer are enabled for operation concurrently.

7. The method of claim 6, wherein the RAKE processing element is enabled for operation and the equalizer is disabled from operation in said other mode of data reception.

8. The method of claim 6, including periodically transitioning from said other mode of data reception to said one mode of data reception.

9. The method of claim 8, wherein the RAKE processing element is enabled for operation and the equalizer is disabled from operation in said other mode of data reception.

10. A wireless communication apparatus, comprising:
an input for receiving data signals via a wireless communication link;
a RAKE processing element coupled to said input;
an equalizer coupled to said input and co-operable with said RAKE processing element to define first and second modes of data reception in said wireless communication apparatus; and
a controller coupled to said RAKE processing element and said equalizer, said controller making a determination of whether said wireless communication apparatus is to transition from one of said first and second modes of data reception to the other of said first and second modes of data reception, said controller making said determination based on a comparison of a first metric associated with said RAKE processing element to a second metric associated with said equalizer;
wherein said first mode of data reception is defined by a first combination of respective operational states of the RAKE processing element and the equalizer;
wherein said second mode of data reception is defined by a second combination of respective operational states of the RAKE processing element and the equalizer; and
wherein said first combination of operational states differs from said second combination of operational states.

11. The apparatus of claim 10, wherein the RAKE processing element and the equalizer are enabled for operation concurrently in said first mode of data reception.

12. The apparatus of claim 11, wherein the RAKE processing element is enabled for operation and the equalizer is disabled from operation in said second mode of data reception.

13. The apparatus of claim 10, wherein said one mode of data reception is a periodically activated test mode in which the RAKE processing element and the equalizer are enabled for operation concurrently.

14. The apparatus of claim 13, wherein the RAKE processing element is enabled for operation and the equalizer is disabled from operation in said other mode of data reception.

15. The apparatus of claim 13, including periodically transitioning from said other mode of data reception to said one mode of data reception.

16. The apparatus of claim 15, wherein the RAKE processing element is enabled for operation and the equalizer is disabled from operation in said other mode of data reception.

17. The apparatus of claim 10, wherein said first and second metrics are respective wireless communication channel metrics.

18. The apparatus of claim 17, wherein said wireless communication channel metrics are channel quality metrics.

19. The apparatus of claim 18, wherein each of said channel quality metrics includes signal-to-noise ratio information.

20. The apparatus of claim 17, wherein said wireless communication channel metrics are channel speed metrics.

21. The apparatus of claim 20, wherein each of said channel speed metrics includes signal correlation information.

22. The apparatus of claim 17, wherein each of said wireless communication channel metrics includes signal correlation information.

23. The apparatus of claim 10, wherein said comparing includes comparing one of said first and second metrics to a biased version of the other of said first and second metrics.

24. The apparatus of claim 23, wherein said one metric is said first metric.

25. The apparatus of claim 23, wherein said one metric is said second metric.

* * * * *